United States Patent Office 3,723,241
Patented Mar. 27, 1973

3,723,241
BONDING OF AROMATIC POLYAMIDE FILM
Julius P. Rakus, Bernards Township, and John A. Penoyer, North Plainfield, N.J., and Michael J. Kowalski, Yonkers, N.Y., assignors to Celanese Corporation, New York, N.Y.
No Drawing. Filed Sept. 23, 1970, Ser. No. 74,891
Int. Cl. B32b 27/06, 27/34
U.S. Cl. 161—227                                  8 Claims

ABSTRACT OF THE DISCLOSURE

Two or more structures of wholly aromatic polyamides, either the same or different, are adhered or bonded together as by welding, by inserting between them a film prepared by the reaction of a 70:30 mixture of meta- and para-phenylene diamine and isophthaloyl chloride, the film containing about 5 to 30 weight percent of polymer solvent, adherence accomplished by applying heat and pressure in the range of about room temperature–600° F. and 15 to 500 p.s.i., respectively.

BACKGROUND OF THE INVENTION

Field of the invention

This invention relates to a procedure for the adherence or welding together of two or more structures of wholly aromatic polyamides and more particularly to a process for the bonding or welding together of such structures by insertion therebetween of a specific polyamide film containing about 5 to 30 weight percent of residual solvent and applying heat and pressure.

Description of the prior art

In recent years wholly aromatic polyamides have come into prominent use for a variety of reasons because they can be formed into strong abrasive-resistant films stable at elevated temperatures and such films have found important utility in areas such as insulation, electrical wiring, automotive and aviation interior headlining materials, decorative trim, slot liners and the like. Generally, these wholly aromatic polyamide films are prepared by the casting of polymers formed by the reaction of aromatic diamines and aromatic diacid dihalides.

In many instances in the use of such materials, it is necessary that two or more pieces of wholly aromatic polyamide structures be welded or adhered together, for example in automotive interior trim. Moreover, in many cases the aromatic polyamide structures may not be of the same type in order to attain certain desirable physical and chemical properties. Accordingly, it has become necessary that means be provided by which such structures may be adhered or welded together in a secure, lasting and aesthetic manner. The method of the present invention provides a wholly aromatic polyamide film which renders economical and advantageous the method of bonding two or more wholly aromatic polyamide structures and therefore meets a distinct need in the art.

SUMMARY OF THE INVENTION

It is accordingly one object of this invention to provide a method for the bonding, welding or adhering together of two or more wholly aromatic polyamide structures.

A further object is to provide adhesive compositions useful to effect handling of two or more aromatic polyamide structures.

A further object of the present invention is to provide a method for the bonding, welding or adhering together of two or more wholly aromatic polyamide films or other structures, either the same or different, by the use of a specific aromatic polyamide film under conditions of heat and pressure.

Other objects and advantages of the present invention will become apparent from the following description.

In satisfaction of the foregoing objects and advantages there is provided by this invention a procedure for the bonding, welding or adhering together of two or more pieces of wholly aromatic polyamides, either the same or different, by insertion therebetween of an aromatic polymer film, prepared by the reaction of isophthaloyl chloride and a 70:30 mixture of meta-phenylene diamine and para-phenylene diamine, containing 5 to 30 weight percent of residual solvent, and applying heat and pressure to effect the bond. Also provided is the solvent-laden film as an adhesive composition.

DESCRIPTION OF PREFERRED EMBODIMENTS

According to the concept of the present invention, it has been discovered that two or more structures of wholly aromatic polyamides, either the same or different, may be bonded, welded or adhered together by insertion between them of a specific aromatic polyamide film. The aromatic polyamide film, employed as an adhesive in the present invention, is a film which has been solution cast from a polymer initially prepared by the reaction of isophthaloyl chloride and an equimolar amount of a mixture of 70 parts meta-phenylene diamine and 30 parts para-phenylene diamine. The polymerization of these materials is conducted at a low temperature (less than 100° C.) in the presence of a polymerization solvent, e.g., gammabutyrolactone, and under conditions of agitation. After completion of the reaction, the resulting polymer is then preferably solution cast from solutions prepared from the finished polymer. Films may be directly cast from the reaction solvent, or the polymers may be precipitated by the addition of water or other suitable nonsolvent, washed, dried and redissolved in a suitable solvent. This latter procedure is a preferred aspect. Suitable classes of solvents which may be used for redissolving include the N,N-dialkylamides, dialkyl sulfoxides, N-alkyl and cycloalkyl lactams such as the pyrrolidones, piperidones and caprolactams, alkyl substituted phosphoramides, tetralkylureas and the like. In these classes of solvents the alkyl groups have about one to seven carbon atoms and the cycloalkyl groups have about five to eight carbon atoms. Specific and highly preferred solvents which may be used in the present invention to redissolve the film include dimethylacetamide, dimethylformamide, dimethylsulfoxide, N-methyl pyrrolidone, N-cyclohexyl pyrrolidone hexamethylphosphoramide, N,N,N',N'-tetramethylurea and the like.

After solution casting of the film from the polymerization mixture or any desired solvent of the abovementioned classes, the solvent is removed therefrom by partial drying so as to permit the film to retain about 5 to 30 weight percent residual solvent. The film is then in proper form for use in the welding or adhering process of the invention. The amount of solvent desired to be retained in the film is achieved by partial drying techniques. For example, for a1 1-mil film, from 15% solids in dimethylformamide, drying for 10 minutes at 190° F., then 10 minutes at 260° F. provides a film containing about 25% solvent. Obviously, these procedures may be varied as desired depending on the film thickness, coating conditions, solvent, etc.

In performing the bonding technique, the film containing about 5 to 30 weight percent of the residual solvent is placed between two or more pieces of aromatic polyamide structure desired to be adhered and subjected to heat and pressure.

Generally, the bonding is preferably carried out under conditions of heat and pressure for best results. In general the temperature should range from about room temperature to 600° F. The pressure may be derived from the shrinkage forces of the film. The pressure will usually range from 15 to 500 p.s.i. Preferred temperature and pressure ranges are about 350-500° F. and 100-200 p.s.i., respectively.

It has been found that by utilizing this specific wholly aromatic polyamide film as the adherent material containing 5-30 weight percent of residual solvent, strong permanent bonds are obtained between wholly aromatic polyamide structures, whether the same or different.

Representative of the wholly aromatic polyamide structures which may be adhered by the adhesive and method of the present invention are those formed from polyamides of high molecular weight which have the following repeating structural unit:

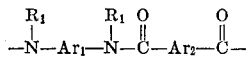

In this formula $R_1$ is selected from the group consisting of hydrogen and lower alkyl and $Ar_1$ and $Ar_2$ are divalent aromatic radicals. In the most preferred compounds of this type, the intralinear polymer bonds are attached directly to non-adjacent carbon atoms in the respective aromatic rings, the bonds being positioned in the meta position in 50-80% of the $Ar_1$ radicals and in the para position in the remaining $Ar_1$ radicals.

These high molecular weight polymers are termed "aromatic polyamides." This term refers to polymers wherein aromatic radicals are linked by a carbonamide group, i.e., the

radical ($R_1$ being the same as above indicated), the nitrogen and carbonyl of each repeating carbonamide radical being directly attached to a carbon atom in the ring of an aromatic radical; that is, the nitrogen and carbonyl of each repeating carbonamide group each replaces a hydrogen of an aromatic ring and the present invention is applicable to all compounds of this type. The term "aromatic ring" means a carbocyclic ring possessing resonance. Exemplary aromatic radicals have the following structural formulas

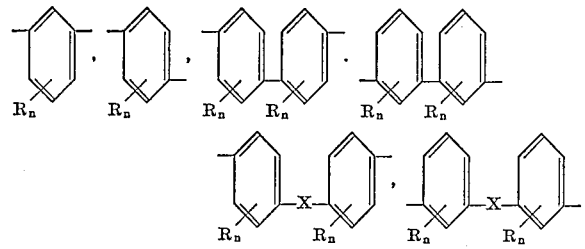

in which R is preferably a lower alkyl, lower alkoxy, or halogen group, $n$ is a number from 0-4, inclusive, and X is preferably one of the groups of

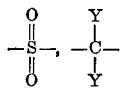

and —O—, in which Y is a hydrogen or a lower alkyl group, X may also be a lower alkylene or lower alkylene dioxy group although these are somewhat less desirable. R may also be a nitro, lower carbalkoxy, or other non-polyamide-forming group. The most preferred of these aromatic radicals are divalent and meta or para oriented, i.e., the unsatisfied bonds of the radical (the "intralinear bonds" when the radical is viewed in the repeating unit of the structural formula of the polymer) are meta or para oriented with respect to each other. One or more of the aromatic radicals may contain substituent groups as indicated and any aromatic ring may contain two or more of the same or different substituent groups. The total number of substituent groups or carbon atoms attached to any aromatic ring is desirably less than about four and preferably all the aromatic radicals are phenylene.

The high molecular weight polymers are prepared by reacting at low temperature (below 100° C.) an aromatic dicarboxylic acid dihalide, preferably the dichloride, with one or more aromatic diamines, preferably a mixture thereof. The amino groups of these aromatic compounds are preferably meta or para to each other, 50-80% by weight being in the meta position, and the aromatic dicarboxylic acid halide is a compound with the acid halide groups positioned meta to each other. Any other wholly aromatic polyamides may be used, however.

Diacid chlorides of dibasic aromatic acids useful as reactants in preparing polymers of the present invention are compounds of the formula:

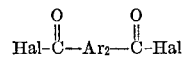

wherein $Ar_2$ is a divalent aromatic radical and Hal is a halogen atom from the class consisting of chlorine, bromine, and fluorine. The aromatic radical may have a single, multiple, or fused ring structure. One or more hydrogens of the aromatic nucleus may be replaced by non-polyamide-forming groups such as lower alkyl, lower alkoxy, halogen, nitro, sulfonyl, lower carbaloxy, and the like. The terms "lower alkyl" and "lower carbalkoxy" refer to groups containing less than five carbon atoms.

Diacid chlorides which may be utilized to prepare the polyamides of this invention include isophthaloyl chloride and lower alkyl isophthaloyl chlorides, such as methyl, ethyl propyl, etc. isophthaloyl chlorides. There may be more than one alkyl group attached to the aromatic ring as in the case of dimethyl, trimethyl, tetramethyl, diethyl, triethyl, and tetraethyl isophthaloyl chlorides. The most preferred reacant is isophthaloyl chloride.

The diamines useful as reactants in forming the polymer of this invention are compounds of the formula

where $R_1$ is hydrogen or lower alkyl and $Ar_1$ is a divalent aromatic radical as defined above and the —NHR groups are preferably oriented meta or para with respect to each other. The diamines may contain single or multiple rings as well as fused rings. One or more hydrogens of the aromatic nucleus may be replaced by nonpolyamide-forming groups such as lower alkyl, lower alkoxy, halogen nitro, sulfonyl and lower carbalkoxy.

Exemplary diamines which may be utilized in this invention include meta-phenylene diamine and lower alkyl substituted meta-phenylene diamine such as methyl, ethyl, propyl, and butyl meta-phenylene diamine; N,N'-dimethyl meta-phenylene diamine, N,N'-diethyl meta-phenylene diamine, etc. There may be more than one alkyl group attached to the aromatic ring as in the case of dimethyl, trimethyl, tetramethyl, diethyl, and triethyl meta-phenylene diamine. The alkyl substituent groups need not be the same; thus compounds such as 2-methyl-4-ethyl meta-phenylene diamine and 2-methyl-4-ethyl-5-propyl meta-phenylene diamine may be utilized. In place of an alkyl group, the aromatic ring may be substituted with one or more lower alkoxy groups such as, for example, methoxy, ethoxy, propoxy and butoxy meta-phenylene diamine. Other representative aromatic diamines which may be utilized include dimethoxy, trimethoxy, tetramethoxy and diethoxy - meta - phenylene diamine, and 2 - methoxy-4-ethoxy meta - phenylene diamine. Halogen - substituted meta-phenylene diamine as exemplified by chloro, bromo, and fluoro meta-phenylene diamine may be utilized. More than one halogen may be attached to the aromatic ring. The halogens in these compounds may be the same or different. Other meta-phenylene diamines which may be used include nitro and lower carbalkoxy meta-phenylene diamines. One or more of the latter groups may be attached to the aromatic nucleus along with one or more alkyl, alkoxy or halogen groups. The most preferred reactant is a 70/30 mixture of meta- and para-phenylene diamine.

The following examples are presented to further illustrate the process of the invention but it is not to be considered as limited thereto.

EXAMPLE I

A copolymer of 70 weight percent meta-phenylene diamine and 30 weight percent para-phenylene diamine and isophthaloyl chloride in equimolar ratios is prepared by adding 20.4 grams of molten isophathaloyl chloride to a Waring blender containing a solution of 7.5 grams metaphenylene diamine and 3.25 grams of para-phenylene diamine in 100 grams butyrolactone.

The polymer is then agitated for about 30 minutes. After the 30-minute period is concluded, the polymer solution is recovered therefrom.

EXAMPLE II

Some of the polymer resulting from the process of Example I was precipitated with water, dried and dissolved in the solvents in the amounts listed in the following table.

TABLE I

| Film number | Solvent | Grams of solvent | Residual solvent, wt. percent |
|---|---|---|---|
| 1 | Dimethylacetamide | 100 | 16.4 |
| 2 | Dimethylformamide | 75 | 10.7 |
| 3 | Dimethylsulfoxide | 50 | 6.4 |
| 4 | N-methylpyrrolidone | 200 | 28.2 |
| 5 | N-cyclohexylpyrrolidone | 150 | 25.1 |
| 6 | Hexamethyl phosphoramide | 100 | 15.2 |
| 7 | N,N,N',N'-tetramethylurea | 100 | 17.3 |

Upon film casting and partial drying, it was determined by chromatography that the resulting film contained as residual solvent the indicated amount of solvent shown in column 4 of the table.

EXAMPLE III

In this example, the films resulting from Example II were utilized in bonding the specific wholly aromatic polyamide in the shape of a film identified below according to the method of the invention. In this example each film of Example II containing the amount of residual solvent indicated was placed between the wholly aromatic polyamide films identified below and subjected to temperatures of 400° F. and 250 p.s.i. for 1 hour. These polyamide films and the bonding films are as follows:

TABLE II

| Film No. | Polyamide film A | Polyamide film B |
|---|---|---|
| 1 | Polymer of isophthaloyl chloride and m-phenylenediamine. | Same as A. |
| 2 | Polymer of isophthaloyl chloride and m-phenylenediamine. | Polymer of terephthaloyl adn m-phenylenediamine. |
| 3 | Polymer of isophthaloyl chloride and p-phenylenediamine. | Polymer of terephthaloyl chloride and p-phenylenediamine. |
| 4 | Polymer of terephthaloyl chloride and 70:30 m-phenylenediamine and p-phenylenediamine. | Polymer of tetramethyl terephthaloyl chloride and m-phenylenediamine. |
| 5 | Polymer of methyl isophthaloyl chloride and 70:30 m-phenylene diamine and p-phenylenediamine. | Same as A. |
| 6 | Polymer of 70:30 isophthaloyl chloride and terephthaloyl chloride and p-phenylenediamine. | Polymer of isophthaloyl chloride and m-phenylenediamine. |
| 7 | Polymer of isophthaloyl chloride and m-phenylenediamine. | Polymer of terephthaloyl chloride and p-phenylenediamine. |

Each of the above-identified bonded films were subjected to peel strength tests (ASTM D–1876) and it was found that cohesive failure of the adherent ensued in each instance without failure of the adhesive bond.

EXAMPLE IV

The experiment of Example III was repeated except that the polymers listed in Table II were non-film structures, that is, they were in the shape of solid rectangular blocks. Using the same solvent-laden film as the adhesive layer under the same bonding conditions of temperature and pressure, it was found that excellent high-tenacity bonds were formed.

EXAMPLE V

An adhesive film of the type of No. 1 from Example II was wrapped in a spiral pattern around a mandrel. Upon rapid heating to about 350° F. and under tension derived from shrinkage of the film, a spiral wrapped tube was produced, wherein adjacent lapped film layers had fused.

The invention has been described hereinbefore with reference to certain preferred embodiments. However, the invention is not to be considered as limited thereto as obvious variations will become apparent to those skilled in the art.

What is claimed is:

1. A method for bonding of two or more pieces of wholly aromatic polyamide structures, either the same or different, which comprises inserting therebetween a wholly aromatic polyamide film, prepared by the reaction of isophthaloyl chloride and a molar mixture of 70:30 meta-phenylenediamine and para-phenylenediamine, the film containing 5 to 30 weight percent of residual solvent, and applying heat and pressure thereto.

2. A method according to claim 1 wherein the heat is about room temperature to 600° F.

3. A method according to claim 2 wherein the pressure ranges from about 15 to about 500 p.s.i.

4. A method according to claim 2 wherein the residual solvent is selected from the group consisting of N,N-dialkyl amides, dialkylsulfoxides, N-alkyl and N-cycloalkyl pyrrolidones, piperidones and caprolactams, alkyl substituted phosphoramides and tetraalkyl ureas, wherein the alkyl group contains from one to about seven carbon atoms and the cycloalkyl group contains from five to eight carbon atoms.

5. A method according to claim 4 wherein the residual solvent is selected from the group consisting of dimethylacetamide, dimethylformamide, dimethylsulfoxide, N-methylpyrrolidone, N-cyclohexylpyrrolidone, hexamethylphosphoramide, and N,N,N',N'-tetramethylurea.

6. A method according to claim 4 wherein said wholly aromatic films have the following repeating structural unit:

wherein $R_1$ is hydrogen or lower alkyl and $Ar_1$ and $Ar_2$ are divalent aromatic radicals.

7. A method according to claim 6 wherein $Ar_1$ and $Ar_2$ are phenyl.

8. Wholly aromatic structures bonded according to the method of claim 1.

References Cited

UNITED STATES PATENTS 3,213,071 10/1965 Campbell _____ 161—252
3,444,025 5/1969 Hillas _____ 161—89
3,094,511 6/1963 Hill et al. _____ 260—78

WILLIAM J. VAN BALEN, Primary Examiner

U.S. Cl. X.R.
156—306, 309, 331